No. 883,557. PATENTED MAR. 31, 1908.
E. L. P. MORS.
LATCH FOR CHANGE SPEED GEARS FOR AUTOMOBILES.
APPLICATION FILED AUG. 21, 1906.
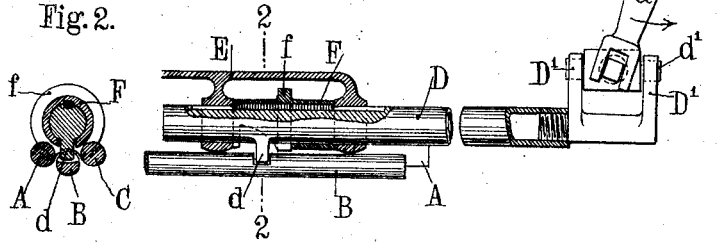
Fig. 1.
Fig. 2.
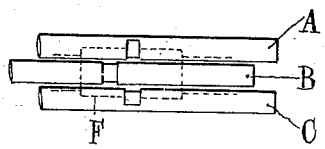
Fig. 3.
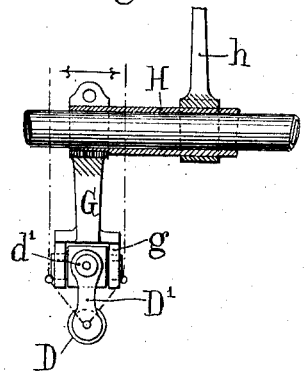
Fig. 4.
WITNESSES
Walter Abbr
L. H. Grote
INVENTOR
Emile Leon Prosper Mors
BY
Howson & Howson
ATTORNEYS

UNITED STATES PATENT OFFICE.

EMILE LEON PROSPER MORS, OF PARIS, FRANCE, ASSIGNOR TO THE SOCIÉTÉ ANONYME D'ELECTRICITÉ ET D'AUTOMOBILES MORS, OF PARIS, FRANCE.

LATCH FOR CHANGE-SPEED GEARS FOR AUTOMOBILES.

No. 883,557.  Specification of Letters Patent.  Patented March 31, 1908.

Application filed August 21, 1906. Serial No. 331,474.

*To all whom it may concern:*

Be it known that I, EMILE LEON PROSPER MORS, a subject of the King of Belgium, of 48 Rue du Theâtre, Paris, France, engineer, have invented a certain new and useful Latch for Change-Speed Gears of Automobiles, of which the following is a full, clear, and exact description.

This invention relates to apparatus for latching or locking the change-speed and reversing mechanism of automobile vehicles.

The description is given hereafter with reference to the annexed drawings in which:—

Figure 1 shows the device in longitudinal elevation, part section. Fig. 2 is a cross section upon line 2—2 of Fig. 1. Fig. 3 is a plan view and Fig. 4 is a view, partly in section, of the mechanism as seen from the left of Fig. 1.

A B C indicate three rods (this number might be less or greater) connected to the parts of a change speed and reversing mechanism, for example, two sliding trains and an intermediate reversing pinion. In operation one rod receives a longitudinal movement, the two others being during this time immobilized. These three rods A B C are placed along an arc of a circle concentric with the axis of a spindle D; the latter which is capable of receiving a longitudinal displacement is maintained in a support E and engaged in a sleeve F revolubly mounted thereon between the two parts of this support E. The sleeve F is connected to the spindle D by a long feather so as to partake of its rotation although allowing its longitudinal displacement.

The spindle D carries a tooth $d$ intended to be engaged in the transverse notch of any one of the rods A B C. The sleeve F has a circular collar or rib $f$ which can engage with the notches in the rods and this rib is cut away at one point to form a notch in line with the tooth $d$.

To the spindle D there can be imparted a longitudinal and rotational displacement by the following contrivance. It carries at its extremity two short arms D' connected by a pin $d'$ on which is mounted at right angles a tube which engages the fork $g$ of an arm G secured to a tubular shaft H, mounted upon a fixed shaft I. The tubular shaft H is attached to the gear lever shown at $h$ to which an angular movement as well as a transverse displacement may be imparted in the well known manner.

It will be seen that when the lever $h$ is given an angular movement the spindle D receives a longitudinal displacement; further when the former is given a transverse displacement the spindle and consequently the sleeve F receives an angular movement. The movements of the lever $h$ are determined so that by the rotation of the spindle D the tooth $d$ is brought into the notch of one or other of the rods A B C, and that the longitudinal movements of said rods are those necessary for the engagement of the gear wheels or other parts connected to the said rods.

The working is as follows:—When by the operation of the lever $h$ the spindle D has been brought to the angular position so that its tooth $d$ is engaged in the notch of that one of the rods A B C which is to be operated, the notch in the collar $f$ upon the sleeve F has effected the same movement and consequently permits the displacement of the rod under consideration, while the two others are locked owing to the entrance of the collar $f$ within their notches; the rod in question can then receive its longitudinal movement while the two others are latched; the same applies for each of the rods A B C, and it will be understood that their number might if desired be increased without difficulty.

My invention may be modified in various ways without evading its scope, and I do not limit myself to the particular construction shown.

I claim as my invention:

1. The combination in shifting mechanism of an operating spindle, and a plurality of shifting-rods parallel thereto and actuated thereby, and means for locking the remainder during the movement of one of the rods by said operating spindle.

2. The combination in shifting mechanism of an operating spindle capable of angular and longitudinal motion, a plurality of shifting rods substantially parallel thereto and capable of individual longitudinal displacement thereby and means for locking the remainder during the movement of one of said shifting rods by said operating spindle.

3. The combination in shifting mechanism of an operating spindle, a plurality of shifting rods actuated by and concentrically arranged around the spindle, and means for locking the remainder during the movement of one of said shifting rods by the operating spindle, substantially as described.

4. The combination in shifting mechanism of an operating spindle provided with a tooth, a plurality of shifting rods arranged concentrically around said spindle and provided with transverse notches adapted to coöperate with said tooth, and means for locking the remainder during the movement of one of said rods by the spindle.

5. The combination in shifting mechanism of an operating spindle provided with a tooth and capable of angular and longitudinal motion, a sleeve on said spindle and secured thereto so as to permit of the free longitudinal movement of the spindle therethrough but locked so as to follow the angular motion thereof, there being a rib on said sleeve provided with a notch to permit the passage of the tooth on the spindle, and a plurality of shifting rods capable of longitudinal movement with the spindle and provided with notches adapted to be engaged by said rib and tooth, substantially as described.

In testimony whereof I have signed my name to this specification, in the presence of two subscribing witnesses.

EMILE LEON PROSPER MORS.

Witnesses:
GUSTAVE DUMONT,
AUGUSTUS E. INGRAM